United States Patent [19]

Okawa et al.

[11] Patent Number: 4,595,386
[45] Date of Patent: Jun. 17, 1986

[54] V-BELT ASSEMBLY FOR TRANSMITTING POWER

[75] Inventors: Susumu Okawa, Numazu; Yasunobu Jufuku; Shigeru Okuwaki, both of Susono, all of Japan

[73] Assignee: Toyota Jidosha Kabushiki Kaisha, Toyota, Japan

[21] Appl. No.: 693,150

[22] Filed: Jan. 22, 1985

[30] Foreign Application Priority Data

Jan. 25, 1984 [JP] Japan .................. 59-10304
Jan. 25, 1984 [JP] Japan .................. 59-10305
Jan. 25, 1984 [JP] Japan .................. 59-10306
Jan. 25, 1984 [JP] Japan .................. 59-10308

[51] Int. Cl.$^4$ .................. F16G 5/16; F16G 1/22
[52] U.S. Cl. .................. 474/201; 474/241; 384/280
[58] Field of Search ........ 474/201, 240, 242, 244–247, 474/255, 265, 272; 384/280, 282, 907

[56] References Cited

U.S. PATENT DOCUMENTS

| | | | |
|---|---|---|---|
| 420,951 | 2/1890 | Millhauser | 384/280 |
| 2,195,226 | 3/1940 | Reeves | 474/241 |
| 2,247,995 | 7/1941 | Gilbert | 384/280 |
| 2,704,234 | 3/1955 | Love et al. | 384/280 |

FOREIGN PATENT DOCUMENTS 0122064 10/1984 European Pat. Off. .......... 474/201
256918 3/1949 Fed. Rep. of Germany ...... 474/201

Primary Examiner—James A. Leppink
Assistant Examiner—Thuy M. Bui
Attorney, Agent, or Firm—Oblon, Fisher, Spivak, McClelland & Maier

[57] ABSTRACT

A V-belt assembly trained over U-belt wheels for transmitting power and which includes a flexible endless belt, a plurality of rigid suspension members secured fixedly to the endless belt perpendicularly to the longitudinal direction of the endless belt and rigid transmission pieces surrounding the respective suspension members in the section perpendicular to the longitudinal direction of the endless belt, supported pivotal projections projecting sideways from both sides of the suspension members and capable of engaging V-shaped grooves in the V-belt wheels. This rigid transmission piece is shaped in the generally rectangular form constituted from two generally U-shaped pieces. At least one of the pivotal projections of the suspension member and holes in the transmission piece located approximately in the center of a space between the top surface and the bottom surface of the transmission piece fitted on the pivotal projections of the suspension member is coated with an antifriction material layer. Two generally U-shaped pieces of the transmission piece are coupled with each other by a joint member in at least one of the top and bottom of these pieces.

19 Claims, 10 Drawing Figures

V-BELT ASSEMBLY FOR TRANSMITTING POWER

BACKGROUND OF THE INVENTION

1. Field of the Invention

This invention relates to a V-belt assembly for transmitting power, and more particularly to a V-belt assembly suitably used for a continuously variable transmission.

2. Description of the Prior Art

While a rubber belt having a trapezoidal section for example is used for such a V-belt assembly, the rigidity (lateral rigidity) in the lateral direction, i.e. direction perpendicular to the longitudinal direction of the belt is low so that the belt is buckled and deformed laterally when it is included in the V-belt wheel and thus unable to transmit a large power. Also, since the thickness of the belt, i.e. the distance between the upper bottom surface and the lower bottom surface is large, a small radius of curvature is difficult to obtain so that a drawback exists in the change gear ratio which cannot be obtained over a wide range.

Further, while a V-belt assembly consisting of an endless metal belt made of a plurality of laminated metal strips and a plurality of rigid transmission pieces is known per se from the Japanese Patent Publication Sho No. 55-6783, it is slidably mounted on the endless metal belt so that a frictional loss is produced and the efficiency of transmission is degraded disadvantageously. Also when the V-belt assembly is included in the V-belt wheels, surplus moment works to rotate the transmission pieces, bringing about a defect in that smooth power transmission from the V-belt wheel to the V-belt assembly is not to carried out.

SUMMARY OF THE INVENTION

An object of the present invention is to provide a V-belt assembly which has a large buckling strength.

A further object of the present invention is to provide a V-belt assembly which is to smoothly transmit power when said V-belt assembly is included in V-belt wheels without producing any surplus moment to rotate transmission pieces and thus any power loss.

A still further object of the present invention is to provide a V-belt assembly which prevents portions of suspension members and transmission pieces slidably each other from wear.

An another object of the present invention is to provide a V-belt assembly capable of mounting transmission pieces on an endless belt.

To achieve these objects according to the present invention, the V-belt assembly comprises a flexible endless belt, a plurality of rigid suspension members fixedly secured to the endless belt perpendicularly to the longitudinal direction of the endless belt and generally rectangular rigid transmission pieces surrounding the respective suspension members in the section perpendicular to the longitudinal direction of the endless belt and pivotably supported by pivotal projections projecting sidewise from both sides of the suspension members and capable of engaging V-shaped grooves of the V-belt wheels, the transmission piece comprising two generally U-shaped pieces.

The transmission piece of the V-belt assembly is thus in the form of a rectangle to receive a compressive force perpendicularly to the longitudinal direction of the endless belt on the bottom and top sides of the transmission piece so that such has a very large buckling strength and a large contact pressure from the side walls of V-shaped groove of the V-belt wheel is adapted to act on the transmission piece. Thus, the transmission torque is to be increased until the endless belt is torn off, so that power remarkably larger than that in conventional rubber belts is to be transmitted. Also, since the endless belt is constituted from woven fabric or the like, its flexibility is larger than that of a metal endless belt consisting of laminated strips or thick rubber belt, and the transmission pieces are to swing freely so that the belt assembly is provided a with small radius of curvature and thus the reduction gear ratio is to be obtained over a large range. Further, since the endless belt is surrounded by the suspension member and further by the rigid transmission piece, it is never subjected to the contact pressure of the V-shaped groove when it is included in the V-belt wheels so that it is to be designed only in consideration of the tension force. The suspension member is secured fixedly to the endless belt and the transmission piece never contacts the endless belt so that the endless belt does not move relatively to the suspension member or the transmission piece and thus any frictional loss is to be avoided so as to increase further the efficiency of power transmission. Furthermore, since the transmission piece is constituted from two U-shaped pieces, the transmission piece is to be mounted on the endless blet and the V-belt assembly is thereby easily assembled by fitting these two pieces onto the pivotal projections of the suspension member from both sides of the suspension member including the endless belt and fitting a blind hole in one piece onto a pin inserted beforehand into another blind hole in the other-piece.

According to the present invention, the center of the hole of the transmission piece fitted onto the pivotal projection of the suspension member coincides approximately with the center of a space between the top and bottom surfaces of the transmission piece both sides thereof. As a result, when the V-belt assembly is included in the V-belt wheels, a surplus moment tending to rotate the transmission piece does not occur since the pivotal projection of the suspension member is approximately in the center of the thickness of the endless belt, so that no power loss occurs and power is smoothly transmitted.

Further in the present invention, the pivotal projections projecting sidewise from both sides of the respective suspension members are fitted in the holes provided in both sides of the transmission piece to support this transmission piece and at least one pivotal projection of the suspension member or one hole in the transmission piece is coated with an antifriction material layer. Since a range in which the suspension member and the transmission piece slidably contact or may contact each other is provided with the antifriction material layer, wear and friction due to the mutual contact of these portions are reduced so as to improve the efficiency of power transmission and the durability of the belt assembly.

According to the present invention, the transmission piece is constituted from two generally U-shaped pieces which are connected to each other by a connecting member in at least one of the top and bottom sides. As a result, mounting of the transmission piece on the endless belt and thus assembly of the V-belt assembly is easily carried out.

The accompanying drawings, which are incorporated in and constitute part of this specification, illustrate embodiments of the invention and, together with the description, serve to explain the principles of the invention.

DESCRIPTION OF THE PREFERRED EMBODIMENTS

Figure 1:
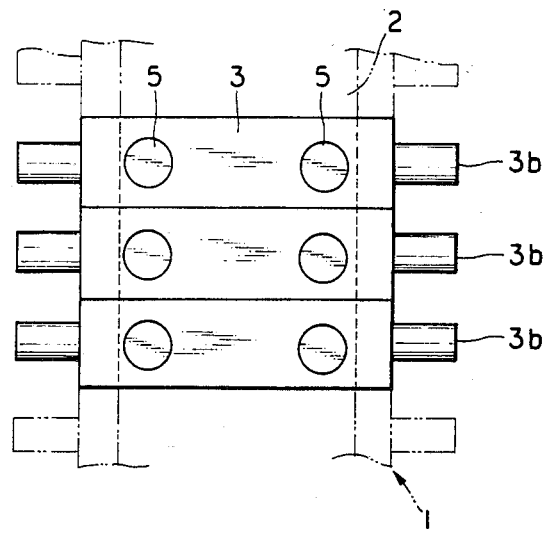
FIG. 1 is a plan view showing a V-belt assembly according to the present invention with the transmission piece being removed.
Figure 2:
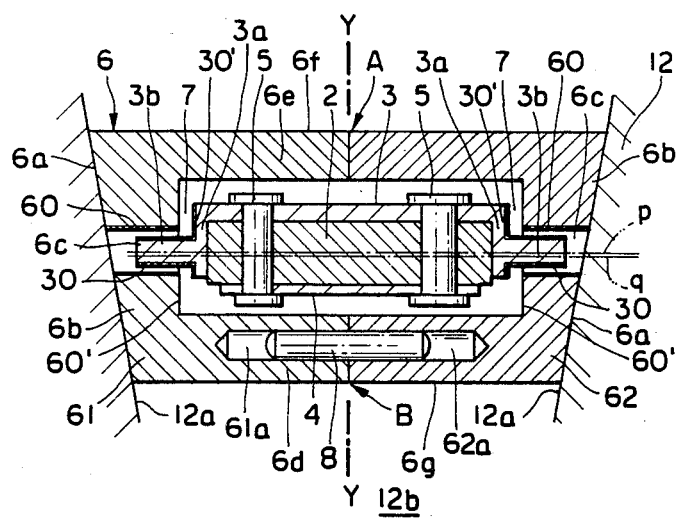
FIG. 2 is a sectional view showing the V-belt assembly taken perpendicularly to the longitudinal direction thereof.

FIGS. 1 and 2 show a V-belt assembly 1 according to the present invention in which a plurality of U-shaped metal suspension members 3 extending perpendicularly to the longitudinal direction of a flexible endless belt 2 consisting of woven fiber of vegetable, animal or synthetic resin fiber or string and surrounding the upper bottom surface and both sides of said endless belt 2 sandwiches fixedly said endless belt 2 together with an opposed metal plate 4 contacting the lower bottom surface of the endless belt 2 by rivets 5 extending through these members 2, 3 and 4. As is apparent from FIG. 1, these suspension members 3 are arranged closely to each other in the longitudinal direction of the endless belt 2. The suspension member 3 is formed on both legs 3a of the U integrally with pivotal projections 3b having the center axis approximately aligned with the center of thickness of the endless belt 2 and projecting sidewise. The generally rectangular rigid transmission piece 6 made of metal, sintered alloy, ceramics or plastics and having slant sides 6a corresponding to the side walls 12a of the V-shaped groove 12b of the V-belt wheel 12 surrounds the suspension member 3 in the section perpendicular to the longitudinal direction of the endless belt 2 and has holes 6c in both sides 6b fitted onto the pivotal projections 3b to be supported pivotably by the suspension member and thus the endless belt 2. As is apparent also from the drawing, the center 9 of the hole 6c is approximately in the center of a space between the top surface 6f and the bottom surface 6g of the transmission piece, thus approximately in the center of the height of the side 6a in FIG. 2 to coincide approximately with the center axis p of the pivotal projection 3b. The diameter of the hole 6c is formed slightly larger than that of the pivotal projection 3b to produce play. According to the present invention, the pivotal projection 3b of the suspension member 3 or the hole 6c in the transmission piece 6 is coated with an antifriction material layer 30 or 60. If necessary, the ranges of the legs 3a and sides 6b opposed to each other may be also provided with such antifriction material layer 30' or 60'. For that end, the ranges to be coated with the antifriction material for the suspension member 3 or the transmission piece 6 made of iron or steel are immersed into a salt bath of 185°–195° C. sulfur compound (KSCN and NaSCN) subjected to electrolytic treatment for about 10 minutes to form a layer of several μm of iron sulfide (FeS) in these ranges.

Figure 3:
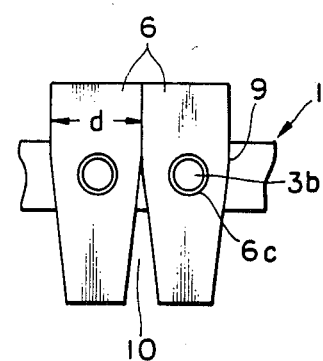
FIG. 3 is a side view showing the same.
Figure 5:
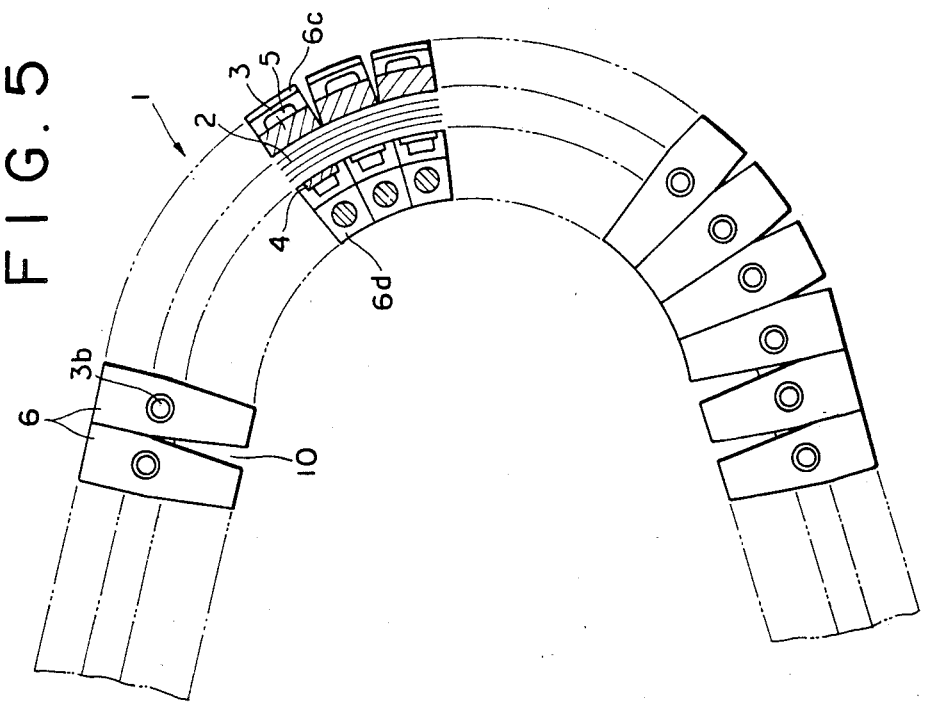
FIG. 5 is a side view showing a partially cut-away side view showing the V-belt assembly trained over the V-belt wheels.

Since the distance between the outer side surfaces of both legs 3a of the suspension member 3 is formed so as to be smaller than that between the inner side surfaces of both sides 6b of the transmission piece 6, a gap 7 will be produced between the leg 3a of the suspension member 3 and the side 6b of the transmission piece 6. Further, since the distance between ends of both pivotal projections 3b is selected so as to be smaller than that between both side surfaces 6a of the transmission piece 6, the ends of the projections 3b will not project from the side surfaces 6a of the transmission piece 6 even if the suspension member 3 together with the endless belt 2 is deviated sideways relative to the transmission piece 6. The rectangular transmission piece 6 consists of two generally U-shaped pieces 61, 62 symmetrical about the longitudinal center plane Y—Y of the endless belt 2 and are coupled with each other in the bottom side 6d by a common pin 8 press fitted into blind holes 61a, 62a coaxially extending from abutting surfaces B of both pieces 61, 62. In the top 6e, both pieces 61, 62 abut against each other on the abutting surfaces A. The width d of the transmission piece 6 taken in the longitudinal direction of the endless belt 2, as is apparent from FIG. 3, is selected to have such a size that adjacent transmission pieces 6 contact each other in the endless belt 2 extending straight. The width d is converged like a wedge from a position 9 above the lower bottom surface of the endless belt 2, i.e. position in the range of thickness of the endless belt 2 toward the bottom 6d. Thus, a triangular gap 10 is left between adjacent transmission pieces 6 under the straight condition of the endless belt 2. The rate of reducing this width d, thus the vertical angle of the gap 10 is selected to have such a size that the gap 10 disappears in the minimum radius of curvature of the endless belt 2 wound around the V-belt wheel with its lower bottom surface being directed to the inside of the curvature (FIG. 5).

Figure 4:
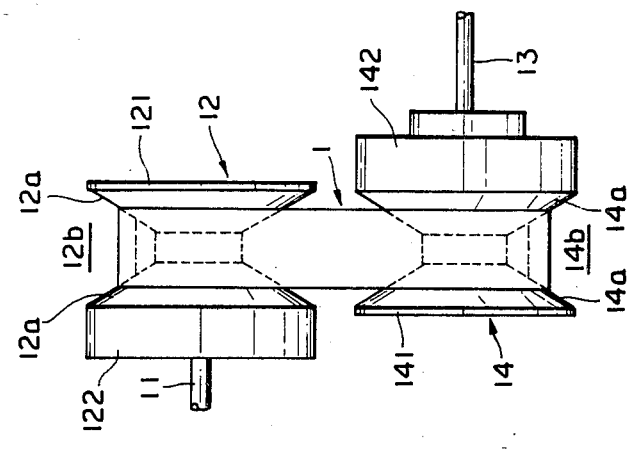
FIG. 4 is a constitutional view showing a continuously variable transmission using the V-belt assembly.

FIG. 4 shows a continuously variable transmission using such a V-belt assembly 1. A drive V-belt wheel 12 consisting of a truncated conical disk 121 fixedly provided on an input shaft 11 and a truncated conical disk 122 opposed to said disk 121 and movably supported only axially on the input shaft 11 forms the side walls of V-shaped groove 12b by the conical surfaces 12a. Similarly a driven V-belt wheel 14 on an output shaft 13 provided parallel to the input shaft 11 also consists of a fixed truncated conical disk 141 and a movable truncated conical disk 142 and defines a V-shaped groove 14b with the conical surfaces 14a. The V-belt assembly 1 is trained over both V-belt wheels 12 and 14 to transmit power from the input shaft 11 to the output shaft 13.

OPERATION

The transmission piece 6 in the V-belt assembly 1 included in the V-shaped groove 12b of the drive V-belt wheel 12 receives the torque of the V-belt wheel 12 from the frictional force between the side walls 12a of the V-shaped groove pinching the transmission piece 6 in the V-belt wheel 12 and the side walls 6a of the transmission piece. This torque as a tension force of the endless belt 2 fixedly attached to the suspension member 3 for supporting the transmission piece 6 is transmitted to the transmission pieces 6 included in the driven V-belt wheel 14 and from the transmission pieses 6 to the driven V-belt wheel 14 in the same manner as above mentioned.

Figure 7:
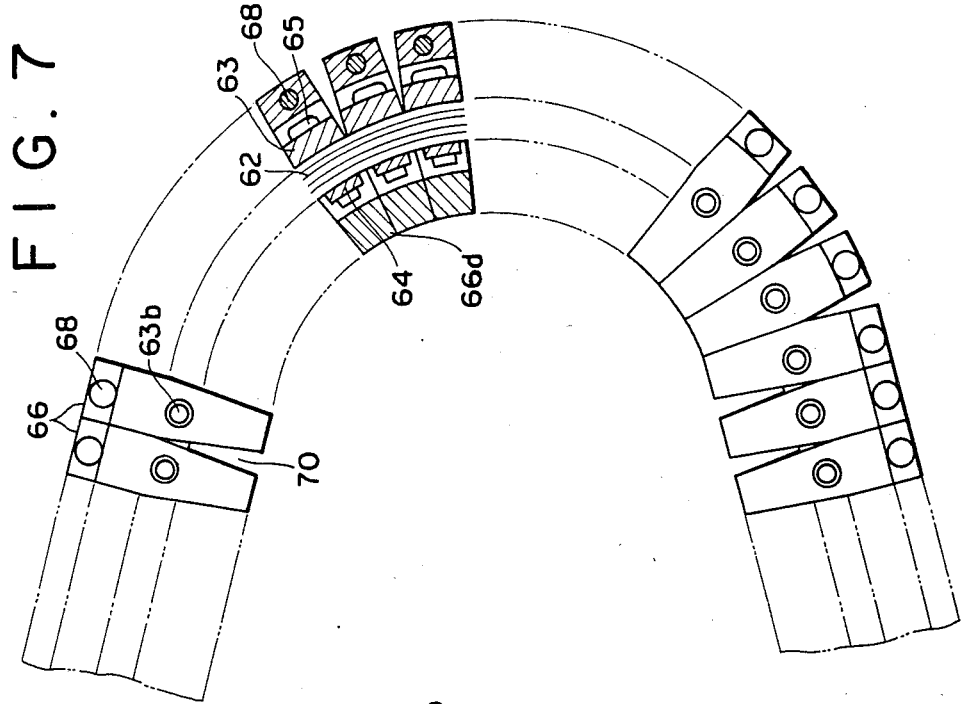
FIG. 7 is a partially cut-away side view of the V-belt assembly trained over the V-belt wheels shown in FIG. 6.
Figure 6:
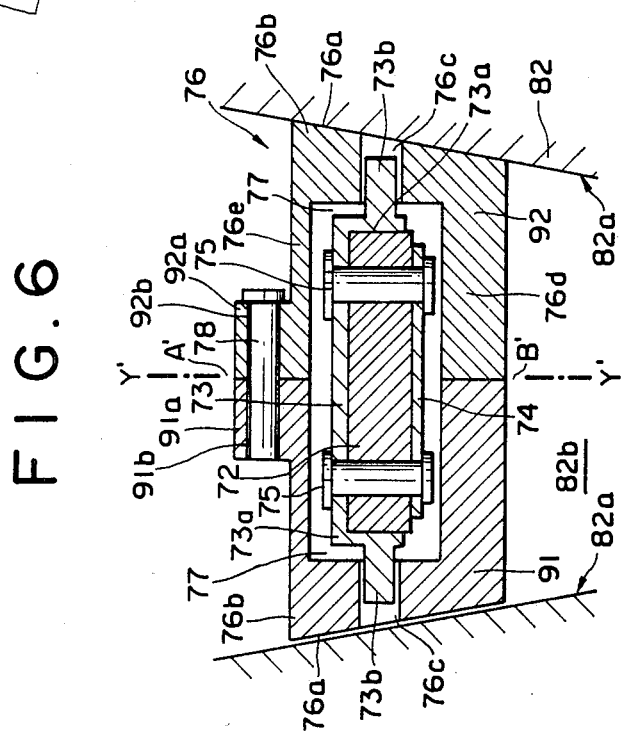
FIG. 6 is a sectional view of the V-belt assembly according to the present invention taken perpendicularly to the longitudinal direction thereof.
Figure 8:
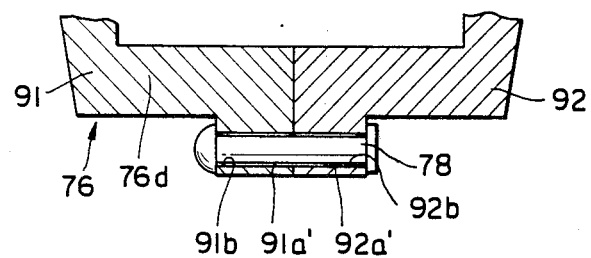
FIGS. 8 to 10 are sectional views showing essential parts of different embodiments respectively corresponding to those in FIG. 6.

FIG. 6 is a side view showing another V-belt assembly 61 according to the present invention, in which a flexible endless belt 72 consisting of woven fiber of vegetable, animal or synthetic resin fiber or string is fixedly sandwiched between a plurality of U-shaped metal suspension members 73 surrounding the upper bottom surface and both sides of said belt 72 and extending perpendicularly to the longitudinal direction of the endless belt and an opposed metal plate 64 contacting the lower bottom surface of the endless belt 72 by rivets 75 extending through these members 72, 73 and 74. These suspension members 73 are arranged in close proximity to each other in the longitudinal direction of the endless belt 72 in the same manner as in FIG. 1. Both legs 73a of the U-shaped suspension member 73 are formed integrally with pivotal projections 73b having the center axis thereof aligned approximately with the center of thickness of the endless belt 72 and projecting sideways. A generally rectangular rigid transmission piece 76 made of metal, sintered alloy, ceramics or plastics and having slant side surfaces 76a corresponding to the side walls 82a of V-shaped groove 82b of a V-belt wheel 82 surrounds the suspension member 73 in the section perpendicularly to the longitudinal direction of the endless belt 72 to be supported pivotably by the suspension member 73, thus the endless belt 72 with holes 76c in both sides 76b is fitted onto the pivotal projections 73b. As seen in the drawing, the diameter of the hole 76c is formed so as to be slightly larger than that of the pivotal projection 73b to produce play. The distance between the outer side surfaces of both legs 73a of the suspension member 73 is formed so as to be smaller than that between the inside surfaces of both legs 76b of the transmission piece 76, so that a gap 77 is produced between the legs 73a of the suspension member 73 and the legs 76b of the transmission piece 76. Further, the distance between the ends of both pivotal projections 73b is selected so as to be smaller than that between both side surfaces 76a of the transmission piece 76, so that the end of the projection 73b will not project from the side surface 76a of the transmission piece 76 even if the suspension member 73 together with the endless belt 72 is deviated sideways from the transmission piece 76. The rectangular transmission piece 76 consists of two generally U-shaped pieces 91, 92 symmetrical about the longitudinal center plane Y'—Y' of the endless belt 72. Each of these pieces 91, 92 have connecting flanges 91a, 92a projecting along abutting surfaces A' in the top sides 76e and are connected to each other by rivets 78 extending through holes 91b, 92b in these flanges as connecting members. Both pieces 91, 92 abut against each other at abutting surfaces B' in the bottom 76d. The width d of the transmission piece 76 taken in the longitudinal direction of the endless belt 72 is selected to have such a size that adjacent transmission pieces 76 contact each other in the endless belt 72 extending straight in the same way as in FIG. 3. This width d is converged like a wedge from a position 79 above the lower bottom surface of the endless belt 72, i.e. position in the range of thickness of the endless belt 72 toward the bottom side 76d. Thus, a triangular gap 80 is left between adjacent transmission pieces 76 under the straight condition of the endless belt 72. The rate of reducing this width d, i.e. the vertical angle of the gap 80, is selected to have such a size that the gap 80 disappears in the minimum radius of curvature of the endless belt 72 wound around the V-belt wheel with its lower bottom surface being directed to the inside of the curvature (FIG. 7). Further as shown in FIG. 8, both pieces 91, 92 may be connected in the bottom 76d of the transmission piece 76 by rivets 78' extending through holes 91b', 92b' in flanges 91a', 92a' formed on both pieces 91, 92 or in both top side 76e (FIG. 6) and bottom side 76d (FIG. 8).

Figure 9:
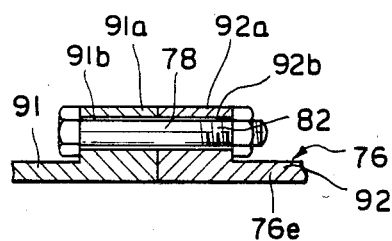
Figure 10:
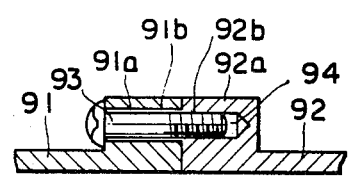

Also, as shown in FIG. 9, bolts 78 and nuts 92 in place of the rivets 78 may be used for the connection. Further, as shown in FIG. 10, screws 93 inserted into holes 91b in one flange 91 may be threaded in female screws 94 formed in holes 92b of the other flange 92a to carry out the connection.

It will be apparent to those skilled in the art that various modifications and variations may be made in the elements of the invention without departing from the scope or spirit of the invention.

What is claimed is:

1. A V-belt assembly trained over V-belt wheels for transmitting power, comprising:
   a flexible endless belt;
   a plurality of rigid suspension members fixedly secured to the endless belt perpendicularly to a longitudinal direction of the endless belt; and
   a plurality of generally rectangular rigid transmission pieces surrounding the respective suspension members in a section perpendicular to said longitudinal direction of the endless belt and supported pivotably by pivotal projections projecting sideways from opposite sides of the suspension member while being capable of engaging V-shaped grooves in the V-belt wheels, wherein each of said transmission pieces is formed of first and second generally U-shaped pieces.

2. A V-belt assembly for transmitting power according to claim 1, wherein the endless belt further comprises woven fiber of vegetable, animal or synthetic material fiber or string.

3. A V-belt assembly for transmitting power according to claim 1, wherein each transmission pieces is made of metal, sintered alloy, ceramics or plastics.

4. A V-belt assembly for transmitting power according to claim 1, wherein each of said U-shaped pieces is symmetrical about the longitudinal center plane of the endless belt.

5. A V-belt assembly for transmitting power according to claim 1 or 4, further comprising means for connecting said generally U-shaped pieces to each other in a bottom side portion thereof.

6. A V-belt assembly for transmitting power according to claim 5, wherein the first and second U-shaped pieces each have respectively blind holes formed therein extending coaxially from abutting surfaces in said bottom side portions and further comprising a common pin for incorporating said first and second piece into the transmission piece wherein said common pin is press fitted into each of said blind holes, respectively.

7. A V-belt assembly trained over V-belt wheels for transmitting power, comprising:
   a flexible endless belt;

a plurality of rigid suspension members fixedly secured to the endless belt perpendicularly to a longitudinal direction of the endless belt; and a plurality of generally rectangular rigid transmission pieces surrounding the respective suspension members in a section perpendicular to said longitudinal direction of the endless belt, fitted onto the supported pivotably by pivotal projections projecting sidewise from opposite sides of the suspension member and having slant side surfaces for engaging V-shaped grooves of the V-belt wheels, a center of the transmission piece hole fitted onto the pivotal projection of the suspension member being approximately coincident with that of a space between top and bottom surfaces of the transmission piece on opposite sides.

8. A V-belt assembly for transmitting power according to claim 7, wherein a center axis of the pivotal projection is located approximately in a center of thickness of the endless belt.

9. A V-belt assembly for transmitting power according to claim 7, wherein the generally U-shaped transmission piece further comprises first and second generally U-shaped pieces symmetrical about a longitudinal center plane of the endless belt.

10. A V-belt assembly for transmitting power according to claim 7 or 9, further comprising means for connecting the two generally U-shaped pieces to each other in a bottom portion thereof.

11. A V-belt assembly for transmitting power according to claim 10, wherein the first and second U-shaped pieces each have respectively blind holes formed therein coaxially extending from the abutting surfaces in said bottom side portions and further comprising a common pin incorporating said first and second piece into the transmission piece wherein said common pin press fitted into each of said blind holes, respectively.

12. A V-belt assembly trained over V-belt wheels for transmitting power, comprising:

a flexible endless belt;

a plurality of rigid suspension members fixedly secured to the endless belt perpendicularly to a longitudinal direction of the endless belt;

a plurality generally rectangular rigid transmission pieces surrounding the respective suspension members in a section perpendicular to said longitudinal direction of the endless belt, and supported pivotably by the suspension member while being capable of engaging V-shaped grooves of the V-belt wheels; and a plurality of pivotal projections projecting sidewise from opposite sides of each transmission piece being fitted in holes provided in both sides of the transmission piece to support the transmission piece, wherein at least one of the pivotal projections of the suspension member and the hole in the transmission piece is coated with an antifriction material layer.

13. A V-belt assembly for transmitting power according to claim 12, wherein the suspension member and the transmission piece are made of iron alloy and the antifriction material further comprises iron sulfide.

14. A V-belt assembly for transmitting power according to claim 13, wherein the iron sulfide layer is formed by the electrolytic treatment of the suspension member and the transmission piece in salt bath of sulfur compound.

15. A V-belt assembly for transmitting power according to claim 12, wherein the antifriction material layer is extended to the inner surface of side of the transmission piece and the side surface of the corresponding suspension member.

16. A V-belt assembly trained over V-belt wheels for transmitting power, comprising:

a flexible endless belt;

a plurality of rigid suspension members fixedly secured to the endless belt perpendicularly to a longitudinal direction of the endless belt; and a plurality of generally rectangular rigid transmission pieces surrounding the respective suspension members in a section perpendicular to the longitudinal direction of the endless belt and supported pivotably by pivotal projecting sidewise from opposite sides of the suspension member while being capable of engaging V-shaped grooves in the V-belt wheels, wherein said transmission piece further comprises first and second generally U-shaped pieces and a connecting member for connecting said first and second U-shaped pieces to each other in at least one of a top side and a bottom side thereof.

17. A V-belt assembly for transmitting power according to claim 16, wherein said first and second generally U-shaped pieces are symmetrical about a longitudinal center plane of the endless belt.

18. A V-belt assembly for transmitting power according to claim 16 or 17, wherein said first and second U-shaped pieces are connected to each other by rivets, bolts-nuts or screws.

19. A V-belt assembly for transmitting power according to claim 16 or 17, wherein each of said first and second U-shaped pieces respectively have at least one flange projecting along abutting surfaces of the top side and/or the bottom side and are connected to each other.

* * * * *